United States Patent [19]
Goldman et al.

[11] Patent Number: 6,117,313
[45] Date of Patent: Sep. 12, 2000

[54] METHOD AND APPARATUS FOR AQUACULTURE AND FOR WATER TREATMENT RELATED THERETO

[76] Inventors: Joshua Goldman, 30 Main St., Montague, Mass. 01351; Rosco Perham, 35 Brookside Ave., Greenfield, Mass. 01301; Scott Lindell, 120 Pulpit Hill Rd. #19, Amherst, Mass. 01376

[21] Appl. No.: 08/773,551

[22] Filed: Dec. 27, 1996

[51] Int. Cl.$^7$ .............................. C02F 3/02; A01K 63/04
[52] U.S. Cl. .................... 210/151; 119/260; 119/261; 210/169; 210/188; 210/218; 210/220
[58] Field of Search ................... 210/109, 150, 210/151, 169, 188, 196, 197, 218, 220, 259, 416.2, 617, 618, 620; 119/259–261

[56] References Cited

U.S. PATENT DOCUMENTS

| | | | |
|---|---|---|---|
| 4,618,418 | 10/1986 | Heiinen et al. | 210/151 |
| 4,988,436 | 1/1991 | Cole | 210/169 |
| 5,330,652 | 7/1994 | Goldman et al. | 210/618 |
| 5,482,630 | 1/1996 | Lee et al. | 210/169 |
| 5,527,455 | 6/1996 | Hoffa | 210/169 |
| 5,593,574 | 1/1997 | Vantoever | 210/169 |
| 5,667,671 | 9/1997 | Munsch et al. | 210/151 |

OTHER PUBLICATIONS

Summerfelt, Steven T., "Engineering Design of Modular and Scalable Recirculating Systems Containing Circular Tanks, Microscreen Filters, Fluidized–Sand Biofilters, Cascade Aerators, and Low–Head or U–Tube Oxygenators," Conference Proceedings, Jul. 19, 1996, pp. 217–244.

Grace, Gary R. and Raul H. Piedrahita, "Carbon Dioxide Control," *AquaGen Engineers,* Feb. 9, 1996, pp. 1–25.

Ebeling, J.M., T.M. Losordo, and D.P. DeLong, "Engineering Design and Performance of a Model Aquaculture Recirculating System (MARS) for Secondary School Aquaculture Education Programs," pp. 211–220, undated.

Rosenthal, Harald and Edward A. Black, "Recirculation Systems in Aquaculture," *Proceedings of an Aquaclutural Engineering Conference,* Jun. 21–23, 1993, pp. 284–294.

*Primary Examiner*—Joseph W. Drodge
*Attorney, Agent, or Firm*—Wolf, Greenfield & Sacks, P.C.

[57] ABSTRACT

An improved aquaculture system is provided which, in various embodiments, utilizes a single integrated unit to perform the biologic filtering, aeration and degassing functions; has a fish tank with an integrated multiphase drain for removal of fecal solids and uneaten feed with minimum water loss, for removing most of the water from the tank to be processed and returned to the tank and for segregating and for then selectively removing moribund and dead fish from the tank, preventing their cannibalization by other fish in the tank; and a single integrated unit for performing degassing, aeration, gas concentration and reaction/separation functions. An improved biologic filter is also discussed.

17 Claims, 6 Drawing Sheets

METHOD AND APPARATUS FOR AQUACULTURE AND FOR WATER TREATMENT RELATED THERETO

FIELD OF THE INVENTION

This invention related generally to the field of water treatment systems and more particularly to such systems for use in conjunction with aquaculture.

BACKGROUND OF THE INVENTION

While world-wide demand for various types of fish and other marine food products has been steadily increasing, both as a result of population increases and because of an increasing world-wide taste for fish-based protein over red meat, the worlds fishery resources are becoming increasingly depleted as a result of over fishing and various environmental problems. Efforts have heretofore been made to overcome the depleted fish resources by use of fish farms; however current fish farming techniques, which include flow through/pump to shore facilities, ponds and marine net pens, face a number of environmental and production constraints which limit their flexibility, expansion potential and economic viability.

First, most of these facilities have very high water consumption, sometimes requiring roughly 10,000 gallons of water to produce a single pound of fish. This requirement for huge quantities of water at substantially constant temperature imposes severe environmental restrictions on placement and operation of aqua-farms, particularly those utilizing the flow-through and pond techniques.

There are also chronic production risks and loses in such a venture which arise as a result of various factors including pollution, uncontrolled transmission of disease, algal blooms and storm damage. Concern also exists over the risk of genetic contamination and disease transmission to wild stocks by escaped farm fish as well as pollution to ocean and waterways resulting from the nutrient loading resulting from the operation of aquaculture facilities.

A declining return on biomass is another problem, it taking an average of two pounds of fish meal-based feed to produce one pound of shrimp or salmon. Similar problems exist for other species.

Production costs are also very high for fish farms because of the substantial land and water area required for the farms, and the fact that such land must be adjacent to a significant water resource, making the land prime land for other uses and therefore relatively expensive. Market limitations also arise due to intermittent product availability which is dictated by factors including climate and seasonal fluctuations, the difficulty of controlling quality of the end product and of protecting from losses as a result of various environmental factors, and the lack of product diversity, since such farms can generally only produce indigenous species.

A need therefore exists for an improved technique for performing fish farming which dramatically reduces water usage, has little or no environmental impact on the surrounding area, protects the seafood stock being grown from disease, pollution, and other potential environmental problems, provides a controlled environment so that product availability and product diversity are independent of the local environment, does not require large land utilization and/or can be located in a relatively inexpensive locations and provides enhanced return on biomass by more efficient use thereof. The ability to collect and utilize waste such as manure and uneaten food and to profitably recycle such waste is also desirable.

A system offered by AquaFuture, Inc., the assignee of this application, overcomes many of the above problems by permitting the fish or other seafood (sometimes collectively referred to hereinafter as "fish" or "seafood") to grow within a controlled environment, for example a large tank, through which water is flowed at a selected rate, with most of the water leaving the rearing environment/tank being purified by for example filtration and degassing, and being aerated before being returned to the tank. The water may also be disinfected during the processing of the water before being returned to the tank. This system is advantageous over the prior art fish farms in that it uses 5% to 10% or less of the water required by other fish farms, thus making it possible to locate the fish farm in areas with modest water resources and significantly reducing water costs for the system. Further, since the water is purified, and if necessary disinfected, before being applied to the tank, and the temperature of the water can also be controlled during the processing, the quality of the available water supply is not critical. Further, since the system is substantially a closed loop system and is self-contained, the system does not pose a contamination risk to wild stock, nor is there a danger of disease or contamination of seafood being grown from wild stock. The ability to operate in a completely controlled environment reduces production risks and losses as a result of factors such as pollution, disease and storm damage, and also removes some of the market limitations resulting from climate and seasonal fluctuations, permitting greater product diversity and substantially year-round operation. The controlled environment also facilitates quality control and permits more efficient utilization of feed, both of which result in improved profitability.

However, existing water reuse technologies generally segment the various water treatment processes into distinct stages, with each stage generally requiring a separate vessel as well as piping connections, control valves, etc. Since these systems typically circulate very large volumes of water, it is critically important that the treatment process be as efficient as possible. Additionally, the sequence of the various unit processes is a significant factor in determining the process efficiency as well as the quantity of feed which can be applied to the system and to the resulting water quality. Reducing the equipment capital cost and increasing process efficiently are critical determinants of success for these systems.

Another problem in these systems is to efficiently remove dead and moribund fish from the tank and to efficiently remove excess feed and manure or other droppings from the livestock. Since it is possible that dead or moribund fish may be diseased and there is a possibility that these fish will spread disease either by water-borne transmission or by being cannibalized by other fish in the tank if they are left in the tank for any period of time, it is important that the dead and moribund fish be removed from the tank relatively quickly and that cannibalizing of these fish while they remain in the tank be minimized. Cannibalization also makes it more difficult to determine inventory losses and thus hinders inventory management. Further, in systems with multiple tanks, nets and divers for removal of dead fish would normally move between tanks, enhancing the possibility of disease spreading within the system. Removal of excess food and of manure is also important to maintain water purity and tracking excess feed can facilitate more efficient feed management. It is important that both the removal of the dead and moribund fish and the removal of excess feed and manure be accomplished in a manner so as to minimize water loss from the closed system, thereby reducing the amount of make up water which must be supplied to the system.

SUMMARY OF THAT THE INVENTION

In accordance with the above, this invention provides an aquaculture system of the type having a tank through which water is flowed at a selected rate, with most of the water leaving the tank being degassed, aerated and biologically filtered before being returned to the tank. The improvements relate to the use of a single integrated unit to perform the biologic filtering, aeration, and degassing functions; the fish tank having an integrated multiphase drain for removal of fecal solids and uneaten feed with minimum water loss, for removing most of the water from the tank to be processed and returned to the tank, and for segregating and then selectively removing moribund and dead fish from the tank; and utilizing a single integrated unit to perform degassing, aeration, gas concentration and reaction/separation functions. The integrated unit for performing biologic filtering, aeration and degassing functions preferably includes a fluidized bed to a selected level in the unit, water to be treated entering the fluidized bed near the bottom thereof and being biologically filtered as it flows through the bed, a water outlet above the water level of the fluidized bed, and an aeration/degassing chamber through which water leaving the fluidized bed flows to reach the water outlet. Water preferably enters the fluidized bed through a distribution network having nozzles and the flow of water at the edges of the bed may be enhanced by providing oversized nozzles at at least selected edges of the distribution network. Riser pipes may also be provided for the distribution network through which access may be obtained to the network. The aeration/degassing chamber may include an outlet through which media from the fluidized bed carried into the chamber by the water may be returned to the bed and may also include inlets through which an oxygen-containing gas is introduced into the water to displace undesirable gases which are to be removed.

The multiphase drain may include a main sump through which most of the water flows and a baffle substantially concentric with and located outside the main sump for directing fecal solids and uneaten food moving across the bottom of the tank through small openings to a removal channel, the openings not being large enough to permit moribund and dead fish to enter the removal channel. The main sump may have a recessed mechanism for collecting moribund and dead fish entering the main sump and for selectively removing the collected moribund and dead fish from the tank. Turbulence in the recessed area discourages cannibalism. The collecting and removal mechanism may include a detector for indicating when a selected quantity of moribund/dead fish have been collected and an actuator operative in response to an indication from the detector for triggering removal of the collected moribund/dead fish. For a preferred embodiment, there is a recessed door covering the main sump through which water but not fish may pass when the door is closed. The detector detecting the accumulation of moribund/dead fish on the door triggers the actuator to open the door to permit removal of the accumulated moribund/dead fish from the tank. A capture chamber may be provided downstream from the main sump with moribund/dead fish leaving the tank being captured in the captured chamber for final removal from the system.

For the integrated degassing/aeration, gas concentration and reaction/separation unit, water entering the unit is preferably passed through a degassing section which reduces the concentration of undesired gasses in the water. The degassing section may be a spray, drip or packed tower, or may utilize a submerged bubbler to remove undesired gases or to add air or oxygen to the water. The degassing section may also include a means for recovering biologic filtering media from the water, such media being a residue of a treatment on the water prior to entering the unit. The unit may also include a concentrator section, water passing from the degassing section into the concentrator section. The concentrator section may for example be a down hole bubble concentrator. A reaction/separation chamber may also be provided, with water passing from the concentrator into the reaction/separation chamber. Finally, a gas vent may be provided from the chamber, gas not absorbed in the water during concentration and reaction being vented through the gas vent for disposal or recycling.

The foregoing and other objects, features and advantages of the invention will be apparent in the following more particular description of preferred embodiments of the invention as illustrated in the accompanying drawings.

DETAILED DESCRIPTION

Figure 1:
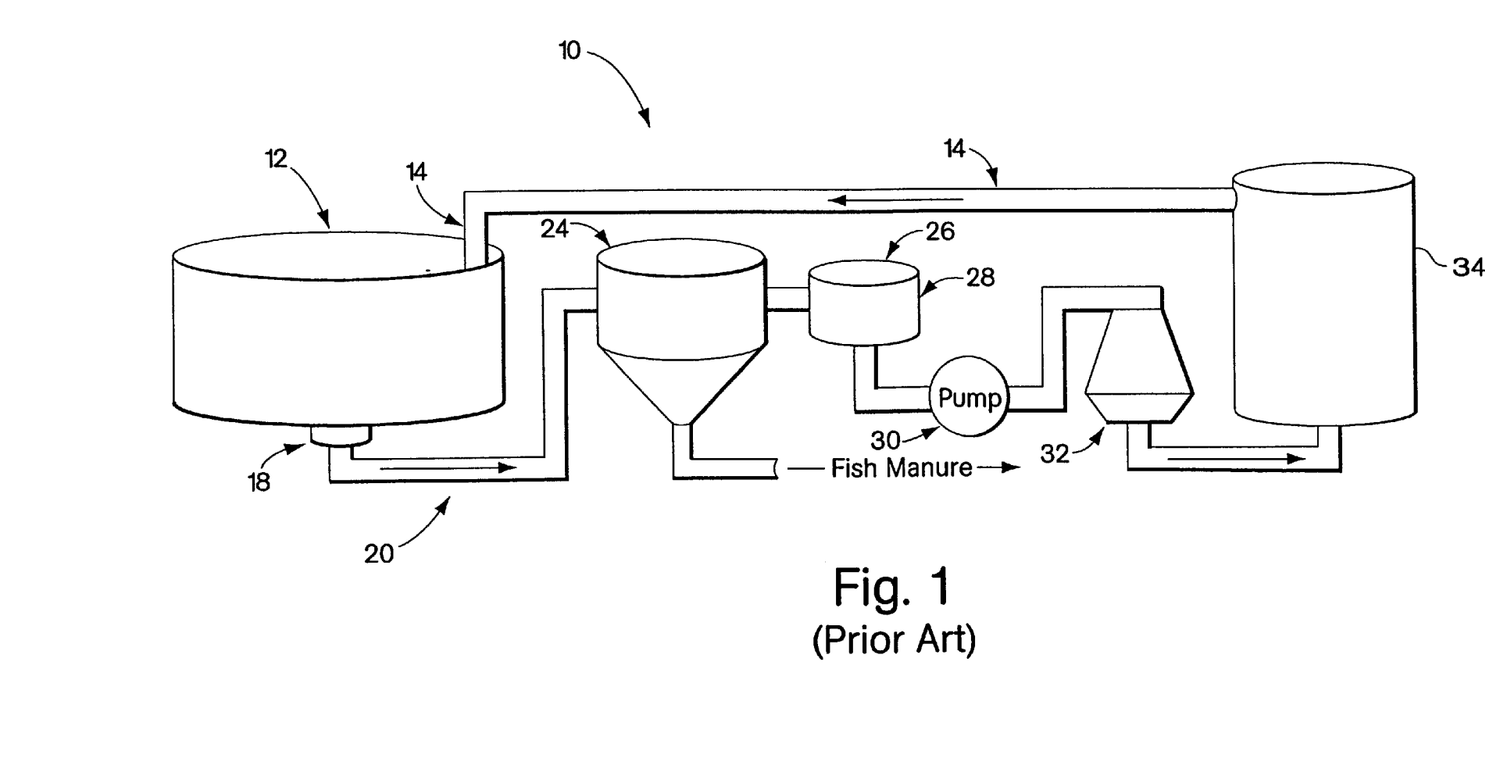
FIG. 1 is a semi-schematic diagram of a prior art aquaculture system which may be modified and improved in accordance with the teachings of this invention.

Referring first to FIG. 1, an existing Aquaculture, Inc. system is illustrated which system includes a large fish tank 12 which may for example contain 150,000 gallons of water. Water enters tank 12 from an input line 14 which is shown schematically in the figure. A water inlet is angled so as to cause the water to circulate in the tank in for example the clockwise direction so that fish swimming in the counter-clockwise direction around the tank do so against a slight current flow, thereby building up their muscles. A sump 18 is provided at the bottom of the tank through which water is removed from the tank. Dead or moribund fish are typically removed from the surface of the tank but may also be removed through sump 18 along with fecal solids and uneaten food. In the prior art, separate sumps or outlets have occassionally been provided for performing various of these functions. However, in the discussion to follow, an integrated sump/drain for performing all three functions will be described in accordance with the teachings of this invention.

Water leaving tank 12 through sump 18 passes through pipe or line 20 to a solid removal device 24, such as a microscreen or sedimentation chamber which removes particulate matter from the water. The water then passes through a degasser 26 which functions to remove undesired gasses such as dissolved carbon dioxide, nitrogen, or ammonia from the fluid flow. Degasser 26 may function in a variety of ways known in the art, including bubbling air into a thin layer of the water to displace the undesired gasses which may then be vented into the atmosphere. From degasser 26, the water flows through a water tank 28 (shown as integrel with the degasser) and pump 30 to an oxygenation unit 32. Tank 28 provides a reservoir or surge tank for pumping since the solid removal device 24 typically works intermittently.

Oxygenation or aeration device 32 uses, for example, a down-hole bubble concentrator to increase pressure so as to saturate or super saturate the water with oxygen. The result is to increase the oxygen concentration from, for example, 8 mg/l going into unit 32 to a concentration of 40 mg/l leaving unit 32. If ozone is used as the gas for oxygenation/aeration, the water is also disinfected during this operation. In some applications this may be desirable.

Water leaving unit 32 is applied to a fluidized bed biological filter 34 which is preferably a media filter of the type shown and described in U.S. Pat. No. 5,330,652, issued Jul. 19, 1994, and assigned to the assignee of the instant application. In such filter, water entering from the top of the unit is piped down to nozzles in a distribution network at the bottom of a media bed. The water then flows up through the media being biologically filtered thereby and is removed from the top of filter 34 through line 14 for return to tank 12.

The flow rate through system 10 can vary with application, with every gallon of water being filtered approximately 25 times a day for a representative system. Further, since system 10 is a closed loop system, water is typically lost from the system only at sump 18 in connection with the removal of fecal matter and excess food. Typically, this results in the loss of only a few percent of the water during each cycle, which water can be replaced at any convenient point in the system, and well over 90% of the water is recycled. As a result, only about 50 to 200 gallons of water are required to produce a pound of fish utilizing the system of FIG. 1, a quantity of water which is approximately 1% of the water used by conventional fish farms. Further, being a closed system which may be contained within a building with ambient temperature controls, the system is not significantly affected by external environment factors such as weather, environmental contamination and biological contamination, and does not itself contribute to contamination of waterways or the infection of wild stock. Feed may also be effectively monitored so as to minimize waste and to increase and decrease feed as required to achieve optimum results. Further, the artificial environment may be controlled to permit the growing of a larger variety of species, including both salt water and fresh water species in separate tanks, and the species which may be grown are independent of season and of the indigenous climate. The system of FIG. 1 therefore overcomes most of the problems discussed earlier for prior art fish farms.

However, any system can be improved, and that is true of the system of FIG. 1 as well. One potential problem with the system of FIG. 1 is that undesirable gasses, including $CO_2$ are removed and aeration is performed prior to the biological filtration in filter 34. However, biological filtration introduces carbon dioxide and other undesired gasses into the water and uses some oxygen from the water. The water exiting biological filter 34 through line 14 and being applied to tank 12 therefore has less oxygen and more $CO_2$ than the water entering filter 34. However, for optimum fish growth it is desirable that the oxygen level for the water in tank 12 be maximized and the $CO_2$ level (and level of undesirable gases) be minimized.

Figure 2:
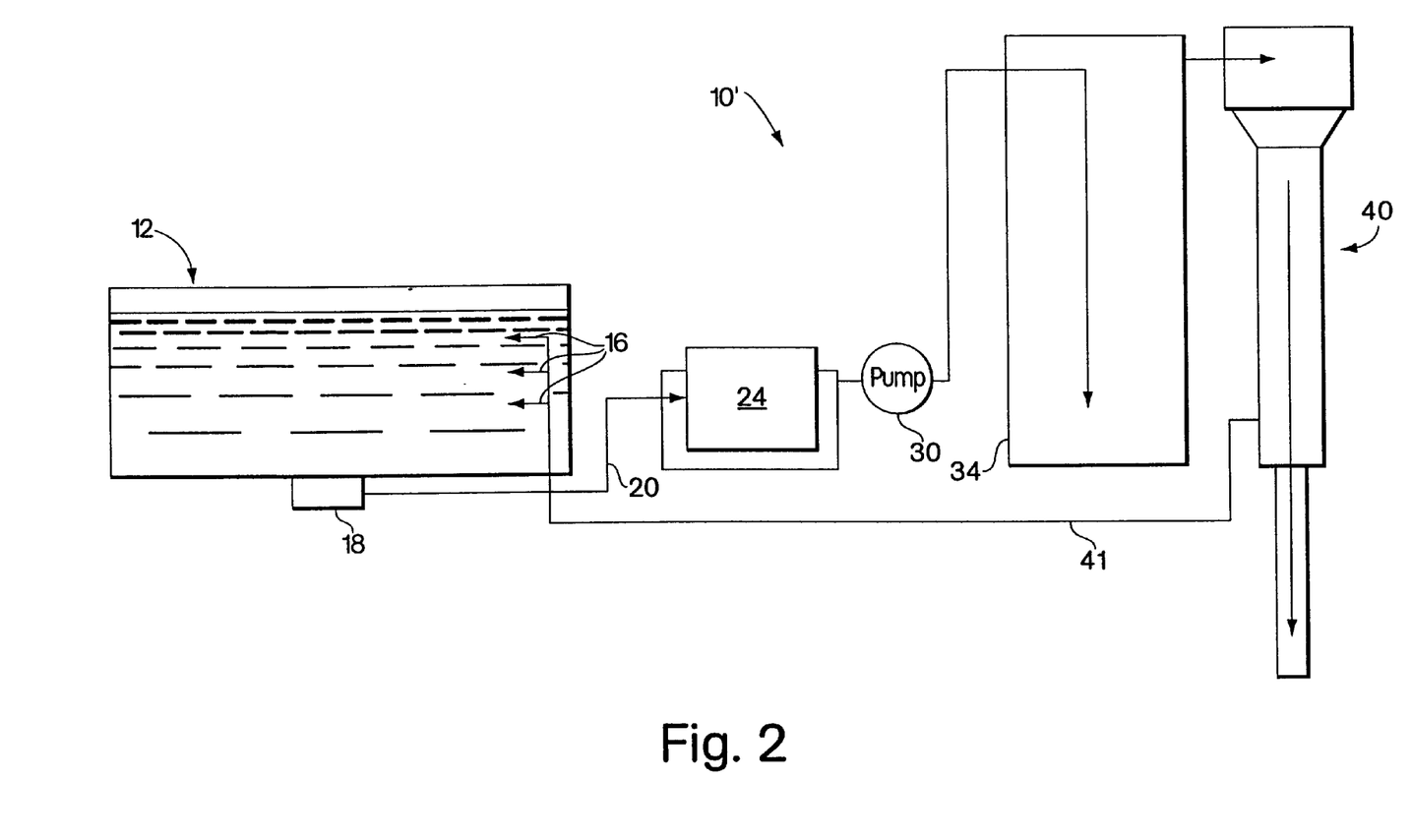
FIG. 2 is a semi-schematic diagram of an aquaculture system in accordance with a first embodiment of this invention.

FIG. 2 shows a system in which this result may be achieved utilizing a system 10' which is optimized to achieve this result.. For the figures, the same reference numerals have been used for common elements. Thus, system 10' in FIG. 2 has a fish tank 12 through which water is circulated from an input line 14 through angled nozzle 16, exiting through line 20 to drum filter (solid removal device) 24 where solid matter is removed. However, instead of a degasser 26 and water tank 28 following the drum filter, pump 30 applies the output from drum filter 24 directly to fluidized bed biological filter 34 for the removal of biological contaminants. The output from the biological filter is then applied through an integrated degasser/aerator, concentrator and reactor/separator unit 40, with the output from unit 40 being returned to tank 12. The system 10' thus degasses the water and aerates/oxygenates the water in a single integrated unit 40 as the final step in the process before the water is returned to tank 12, thus assuring that the oxygen level in the water returning to tank 12 is maximized and that the level for $CO_2$ or other undesired gases in the water returned to the tank is minimized.

Figure 5:
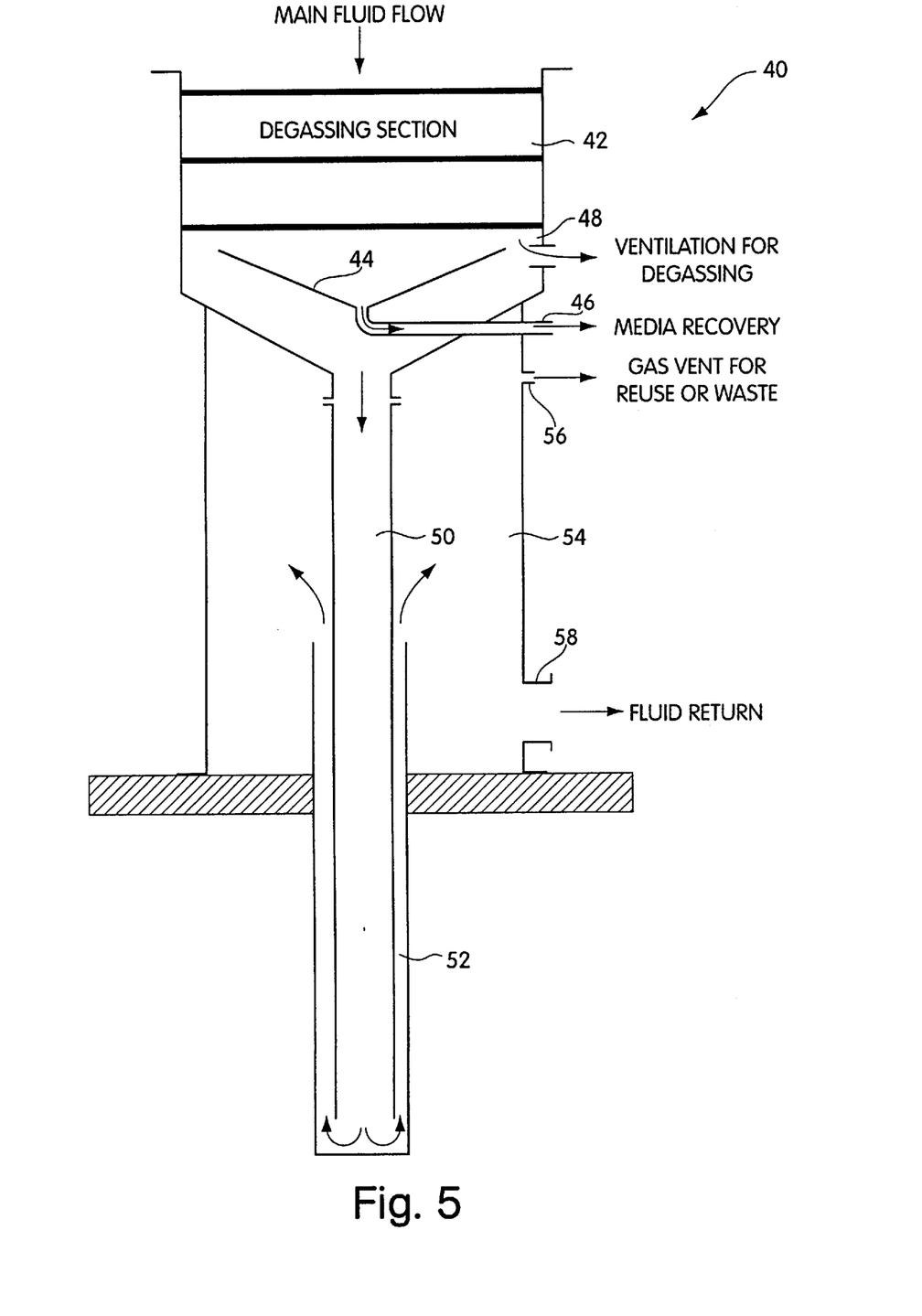
FIG. 5 is a diagram of an integrated aerator/degasser/concentrator suitable for use in the embodiment of the invention shown in FIG. 4.

FIG. 5 is a more detailed view of the integrated unit 40. From this figure, it is seen that the main fluid flow initially enters a degassing section 42 at the top of the unit. This section reduces the concentration of undesirable gasses such as dissolved nitrogen, ammonia, and/or carbon dioxide and may be achieved in a variety of ways known in the art. For example, the upper section may be a gravity or vacuum spray tower where air or another oxygen-containing gas is maintained in contact with the fluid in order to displace the undesired gases as the water passes down the tower, a packed tower which operates in a similar manner except that the water flows through a plastic medium which slows its flow and permits the air to more effectively perform the degassing operation, or a diffusion system where air or other suitable oxygen containing gas is bubbled through a relatively thin layer of the fluid. Selected other degassing techniques including bubble concentrator and speece cone might also be utilized. In addition to removing undesired gases, the degassing/aeration operation in upper section 42 also reduces the total gas pressure in the fluid in preparation for the concentration occurring in the lower chamber. For the preferred embodiment shown in the Figure, water flowing through upper section 42 passes into media recovery area 44 where media from fluid bed 34 may be collected and returned through a pipe to filter 34. Some water will be fed back to filter 34 along with the media. Venting into the atmosphere for the undesired gases may be provided through a channel 48, this channel either being formed of a material which is porous to gases, but not to water, or having a head which is above the water line for unit 40 so that gas may bubble out through chamber 48 but water does not flow.

From upper section 42, the water flows into a concentrator 50 which is shown in FIG. 5 as a down hole bubble concentrator. This chamber may for example be 60 feet deep and air or other oxygen containing gas may be added to the water as it flows through this chamber. The chamber provides additional time for reaction, permitting the saturation or super saturation of the water with oxygen. If ozone is added to the water during this operation as one of the oxygen-containing gases, or as the only oxygen-containing gas, disinfecting of the water also occurs during this operation. As the oxygen-containing water flows up through outer chamber 52 and into reaction chamber 54, undissolved off-gas is separated, particularly in reaction chamber 54, and the off-gases may either be vented as waste through vent 56 or may be recycled for use in concentrator 50. Where used, the off-gas is most commonly used to increase the gas-to-liquid ratio in the concentrator and to improve process economics. The aerated water exits units 40 through conduit 58 for return to fish tank 12 through line 41.

From the above discussion, it is apparent that the unit 40 operates synergistically to improve the efficiency in performing the various functions as opposed to performing them in separate units, thereby minimizing capital and operating costs while enhancing water quality in the system. More particularly, the integration reduces the investment cost associated with multiple specialized vessels as well as the plumbing and valving typically required for controlling flow and isolation. The sequential integration of these processes into a single unit improves process efficiency, enhances simplicity and minimizes energy costs associated with the head loss required to move fluid through a traditional process scheme.

Figure 3:
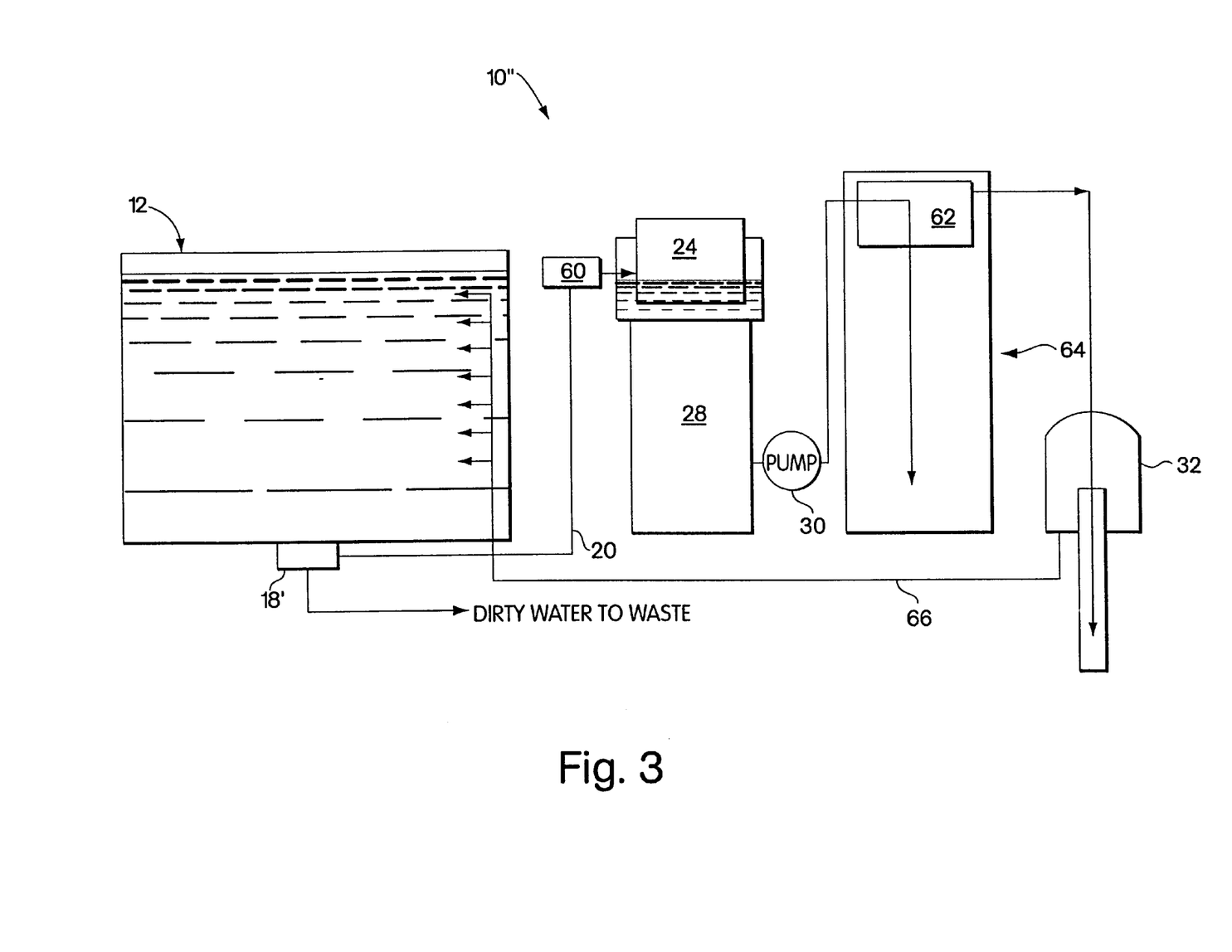
FIG. 3 is a semi-schematic diagram of an aquaculture system in accordance with a second embodiment of this invention.

FIG. 3 shows an alternative configuration 10″ which differs in several respects from the system shown in FIG. 1. First, the system of FIG. 3 shows a sump 18′ and a mort sump/capture chamber 60 of this invention which will be described in greater detail in conjunction with FIG. 4. Second, the degasser 26 is replaced by a degasser 62 which is part of an integrated biological filter/degasser unit 64, with the aeration unit 32 being moved from the input of biological filter 34 to the output of degasser 62 in integral unit 64, the output 66 from aeration unit 32 being applied as the fluid input to fish tank 12. Thus, as for the embodiment shown in FIG. 2, the embodiment of FIG. 3 has both the degassing and aeration functions performed after the biological filtering has occurred, thus resulting in maximum oxygen content and minimum carbon dioxide/undesired gas content in the water being applied to the fish tank.

Figure 4:
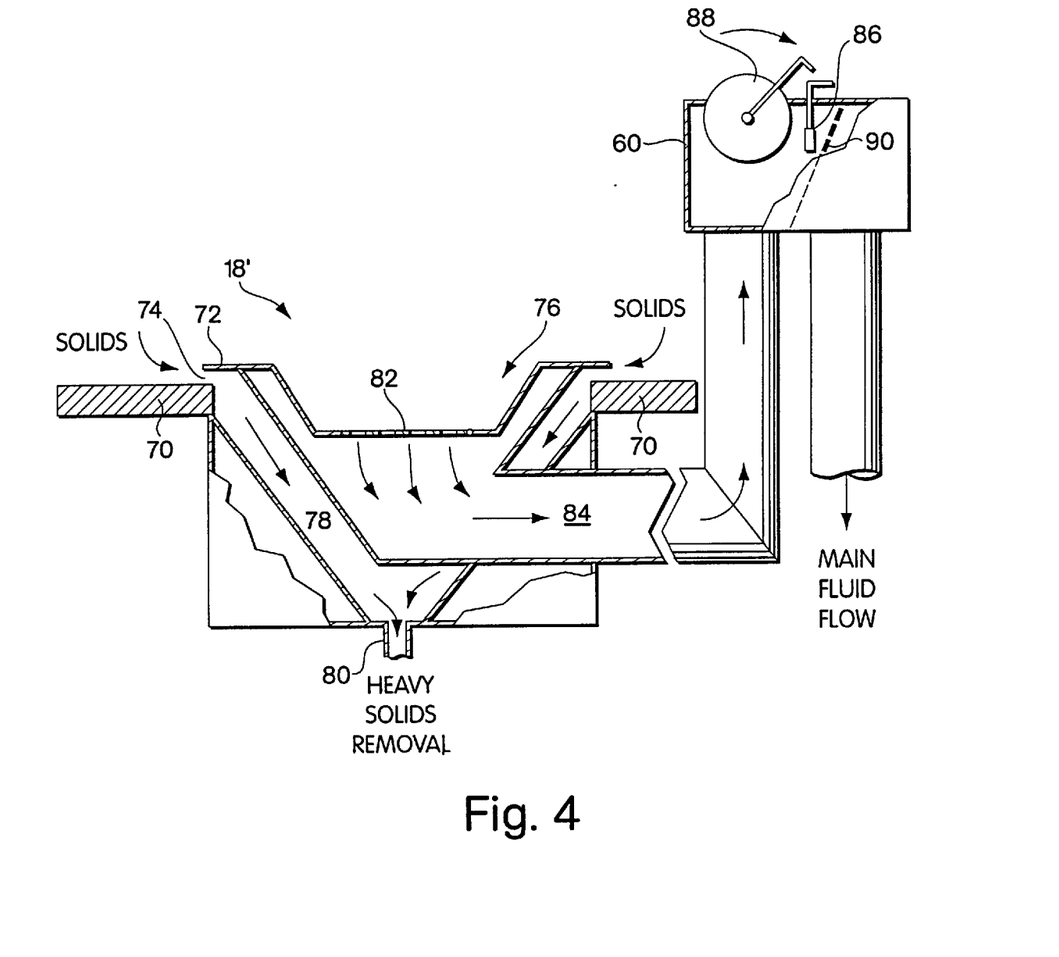
FIG. 4 is a diagram of an integrated multiphase drain and mortality removal system which may be used in the fish tank for the embodiments shown in FIGS. 1, 2 and 3.

FIG. 4 shows the multiphase drain/sump 18′ in accordance with the teachings of this invention, which while shown used for the tank 12 in FIG. 3, may also be used with the tanks 12 for the other embodiments of the invention; and also shows the sump or capture chamber 60. The drain and capture chamber shown in FIG. 4 are intended to perform a variety of functions, and in particular to facilitate the separation and removal of (i) fecal solids and uneaten feed (ii) production mortalities, and (iii) residual water for filtration and reuse. Accomplishing these functions in an integrated device enhances water quality by facilitating the rapid removal of solids prior to decomposition and waste with minimum loss of water from the system. Waste feed can also be rapidly detected as part of an automated feeding control system, thereby permitting near optimum feed management. This enhances overall profitability of the system. Further, fish health is enhanced by segregating moribund and/or dead fish from the rest of the population while they are within the tank so that they are not subject to cannibalism which is often implicated in the spread of disease. Production inventories can also be maintained with a high degree of accuracy by knowing the number of fish initially stocked in the tank and subtracting a fairly accurate count of the removed moribund and dead fish. Further, the removal of the fecal solids and extra feed with minimal water permits these items to be collected relatively easily either for disposal, or preferably for processing for fertilizer or other uses. Further, this device reduces the risk of cross contamination between different systems by minimizing or eliminating the need for nets or divers which would ordinarily be used to remove mortalities and could spread disease.

More specifically, drain 18′, which is embedded in a suitable opening in the floor 70 of tank 12, may be formed of a suitable material which is not corroded by water, stainless steel and fiberglass being examples of suitable materials. The drain includes a baffle 72 which is supported so as to provide a small, circular opening 74 encircling a main drain 76. Baffle 72 directs fecal solids and uneaten feed, both of which have a high specific gravity and which normally move horizontally across the floor of the tank into a cone-shaped chamber 78 within the drain. Once the solids are in this sloped, cone-shaped chamber, they are transported with a relatively minor portion of the total flow into a pipe 80 for removal from the system. An ultrasonic, infrared or other suitable waste feed detector may be provided, for example in chamber 78, which distinguishes the waste feed by its density from the manure. The detection of uneaten waste feed permits a determination to be made when the fish have been satiated, thereby affording better management of the system, improving feed conversion efficiency and reducing feed waste and the pollution resulting therefrom. That the waste feed determination may be utilized to either automatically, or by human intervention, control the delivery of feed to tank 12. Because the flow required to transport the solids is minor, the solids flowing through pipe 80 are concentrated to facilitate treatment and/or disposal. As previously indicated, the solids removed through pipe 80 may be processed to produce fertilizer or for other useful purposes.

A recessed door or other movable screen 82 is provided over main drain 76, door 82 having openings therein which permit water to normally flow through the door but prevent dead or moribund fish from passing into the main fluid flow channel 84. It should be noted that dead/moribund fish are carried across the bottom of the tank to the main drain 76, the opening 74 created by baffle 72 being too small to allow these fish to enter chamber 78. Further, the fluid current within the recessed area above door 82 is sufficiently turbulent to behaviorally discourage live fish from entering the area. This feature reduces the incidence of cannibalism on the dead and dying fish and thus inhibits the spread of disease. An optical or other detector can be provided in drain 76 to detect when a selected level of fish has accumulated over door 82. Alternatively, the accumulation of dead/moribund fish over door 82 will block the openings in the door and will result in reduced flow into channel 84. A level or flow monitor 86 downstream from the drain, for example in capture chamber 60 as shown in FIG. 4, can be utilized to notify an operator that a certain number of mortalities have accumulated over door 82. An operator can then operate a handle mechanism 88 to open door 82, the door being mechanically linked to the handle by a chain, rope or other suitable linkage mechanism which preferably passes through channel 84. Alternatively, an output from monitor 86 can trigger the automatic actuation of door 82. Door 82 may be hinged as shown, may slide horizontally away from over channel 84, may fold, or may open in other ways known in the art. Opening door 82 allows the accumulated mortalities to flow out of the sump with the fluid flow and into the capture chamber 60. Capture chamber 60 incorporates a screen or grating 88 in which the mortalities may be collected, facilitating the final and orderly removal of the moribund/dead fish from the system. The removal of the mortalities collected on screen 88 may for example be done manually. The collected mortalities may either be hand or automatically counted or a fairly accurate estimate of such mortalities may be made either by weighing the mortalities or by an estimate of the number of mortalities required to be collected on door 82 before it is triggered.

Figure 6:
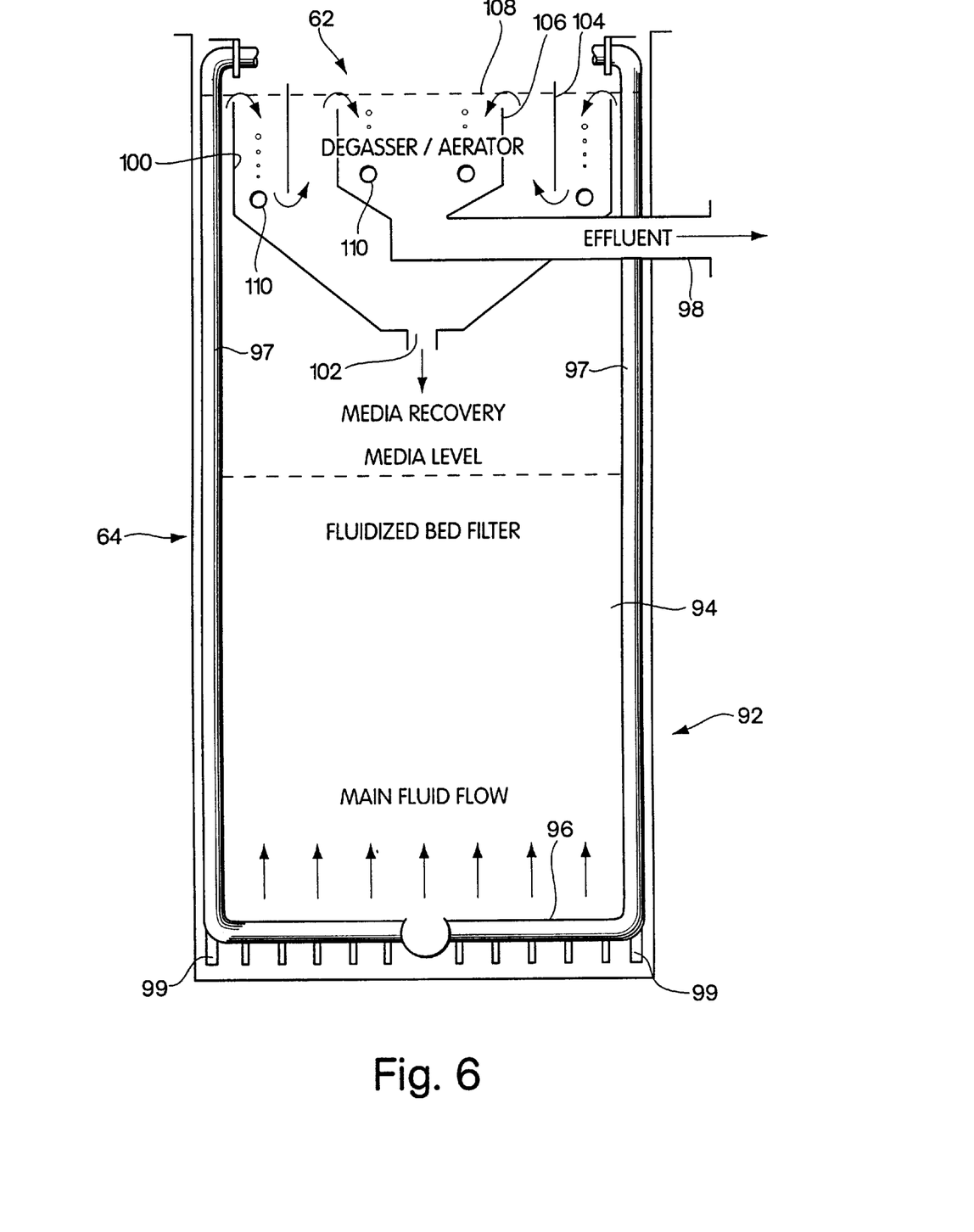
FIG. 6 is a diagram of a fluidized bed biofilter/aerator/degasser suitable for use with the embodiment of the invention shown in FIG. 3.

FIG. 6 illustrates a preferred embodiment for the integrated fluidized bed biofilter/degasser 64 of FIG. 3. The lower portion of this unit is a fluidized bed biological filter 92 of the type described in the aforementioned '652 patent. In such filters, water enters a media bed 94 through a distribution network 96 located near the bottom of the media bed. The water is then filtered as it flows up through the media bed in a manner known in the art. Since this biofiltration generally relies on both heterotopic and autotrophic bacteria, the overall bacterial dynamics in the biofiltration process results in an increase in carbon dioxide level in the water and an decrease in oxygen level.

Also as discussed in the '652 patent, riser pipes 97 extend up through the media bed 94 and above the water level from selected points along distribution network 96, which riser pipes may be used for a variety of purposes in conjunction with fluidized beds, including maintaining a head to sustain fluid flow from nozzles of the distribution network in the event fluid flow is interrupted, thereby preventing migration of media from the media bed into the distribution network, and providing access to the distribution network for flushing or otherwise removing media from the network without the need for removal of the overlying media bed. A feature shown in FIG. 6 which is not present in the '652 patent are enlarged outer nozzles 99 on each section of the distribution network. It has been observed that there is an edge effect in the fluidized bed which results in greater fluid flow near the center of the bed and reduced flow along the walls of the vessel. Enlarged nozzles 99 provide more water along the edges of the fluidized bed container to promote equalization of the fluid flow in bed 94.

Water leaving media bed 94 is directed by baffles to flow through degasser/aerator 62, fitted in and forming part of unit 64, before exiting the unit through pipe 98. In particular, water flow through degasser/aerator 62 is controlled by a first outer baffle 100 having a slanted lower portion which terminates in a media recovery opening 102, a second baffle 104 and a third baffle 106 which terminates in a slanted lower portion leading into outlet pipe 98. The upper edges of baffles 100 and 106 are below water line 108 while the upper edge of baffle 104 is above the water line. Water thus flows into unit 62 over the top of baffle 100 and flows as shown by the arrows under baffle 104 and over the top of baffle 106 to outlet pipe 98. Any media carried into unit 62 by the water, being heavier than the water, will tend to drop out of the water under the action of gravity as the water flows through unit 62 and will be collected along the slanted lower wall of baffle 100 and pass through opening 102 under the action of gravity to be returned to the media bed 94. Nozzles 110 are provided at various points in unit 62, only a few of which are shown for purposes of illustration in the figure, through which air, ozone, or some other oxygen-containing gas may be bubbled. The gas from nozzles 110 displaces the $CO_2$ and other undesirable gases in the water and replaces these gases with oxygen, thereby raising the oxygen level in the water and reducing the carbon dioxide levels. Unit 62 also reduces the pressure head in the fluid in preparation for the final oxygenation/concentration step in unit 32 prior to the water being returned to the fish tank. While in FIG. 6 the undesired gases are being shown as vented from the top of the integrated unit 64, this may not always be desirable. In particular, the system 10 as shown in the various figures is typically utilized in an enclosed building. If the room in which the system is being utilized is large enough, the HVAC of the building may be adequate to remove such undesired gases without permitting them to reach undesirable levels. However, where the system is being used in a smaller room, it may be desirable to provide a lid or cap (not shown) over unit 64 and a vent either through the cap or through an upper wall of the unit 64 through which the undesired gases may be vented outside the building.

An improved aquaculture system, and in particular for water treatment in connection with such aquaculture systems, has therefore been described. While specific embodiments have been discussed above for the improved systems, and various modifications on such embodiments have also been discussed, it is to be understood that these embodiments are being shown for purposes of illustration only and that the foregoing and other changes in form and detail may be made therein by one skilled in the art while still remaining within the spirit and scope of the invention which is to be defined only by the appended claims.

What is claimed is:

1. An aquaculture system including:

an aquaculture tank;

a single integrated unit having a biological filter and a combined aerator/degasser, water entering said unit passing first through said biological filter to said combined aerator/degasser, said degasser operable for removing at least $CO_2$ from water passing therethrough; and apparatus configured to circulate water through a circulation path at a selected rate, said circulation path being at least through said tank, then through the biological filter of said unit, then through the combined aerator/degasser of said unit, and back to the tank.

2. A system as claimed in claim 1, wherein the biological filter of said integrated unit includes a fluidized bed extending to a selected level in the unit, water to be treated entering the fluidized bed near the bottom thereof and being biologically filtered as it flows up through the bed, a water outlet above said selected level and wherein said combined aerator/degasser is located so that water leaving the fluidized bed flows through it to reach the water outlet of said integrated unit, said water outlet forming part of said circulation path.

3. A system as claimed in claim 2, wherein said aerator/degasser includes an outlet through which media from the fluidized bed carried into the aerator/degasser by the water may be returned to the bed.

4. A system as claimed in claim 2, wherein said aerator/degasser includes inlets through which an oxygen-containing gas is introduced into the water to displace undesirable gases which are to be removed.

5. A system as claimed in claim 4 including a cover for preventing the displaced undesirable gases from escaping from the top of the unit and a vent for directing the displaced undesirable gases to a desired location for disposal.

6. A system as claimed in claim 1, wherein the biological filter of said unit comprises a fluidized bed having a distribution network positioned near the bottom of the bed through which water is outletted into the bed for biological filtering, and wherein said distribution network has riser pipes extending above the water level in said unit in which a head of water is formed during operation of the unit and through which access may be obtained to the distribution network.

7. A system as claimed in claim 6, wherein said distribution network has nozzles through which water passes into the fluidized bed, at least some of the nozzles at edges of the distribution network being larger than other nozzles of the network to facilitate greater fluid flow at corresponding edges of the fluidized bed.

8. An aquaculture system including:

an aquaculture tank;

a biological filter;

a degasser operable for removing undesired gases from water flowed therethrough, including $CO_2$;

an oxygenation unit; and apparatus configured to circulate water through a circulation path at a selected rate, the circulation path including in sequence at least said tank, said biological filter, said degasser and said oxygenation unit before returning to said tank.

9. An aquaculture system including:

and aquaculture tank;

a biological filter;

a single integrated unit having an aeration component, a degassing section operable for removing undesired gases, including at least $CO_2$, from water flowing therethrough, a concentrator section and a reaction separation component; and apparatus configured to circulate water through a circulation path at a selected rate, the circulation path including in sequence at least said tank, said biological filter, said degasser and said oxygenation unit before returning to said tank.

10. A system a claimed in claim 9, wherein the degassing section is located to treat water entering the integrated unit which reduces the concentration of undesired gases in the water.

11. A system as claimed in claim 10, wherein the degassing section is one of a pressured, gravity, vacuum spray or packed tower, a down hole bubble concentrator, a speece cone or a submerged aerator.

12. A system as claimed in claim 10, wherein the degassing section also adds oxygen to the water.

13. A system as claimed in claim 10, wherein the degassing section also includes a component operable for recovering biological filtering media from the water, such media being a residue of a treatment on the water prior to its entering the unit.

14. A system as claimed in claim 10, wherein, water passes from the degassing section to said concentrator section.

15. A system as claimed in claim 14, wherein the concentrator section is a down hole bubble concentrator.

16. A system as claimed in claim 14, wherein the reaction separator component includes a reaction/separation chamber, water passing from the concentrator section into said reaction/separation chamber.

17. A system as claimed in claim 14, including a gas vent from said concentrator section, gas not absorbed in the water during concentration and reaction being vented through said gas vent for disposal or reuse.

* * * * *